W. COOPER.
VEHICLE BRAKING SYSTEM.
APPLICATION FILED OCT. 3, 1905. RENEWED DEC. 14, 1908.
1,003,035.
Patented Sept. 12, 1911.
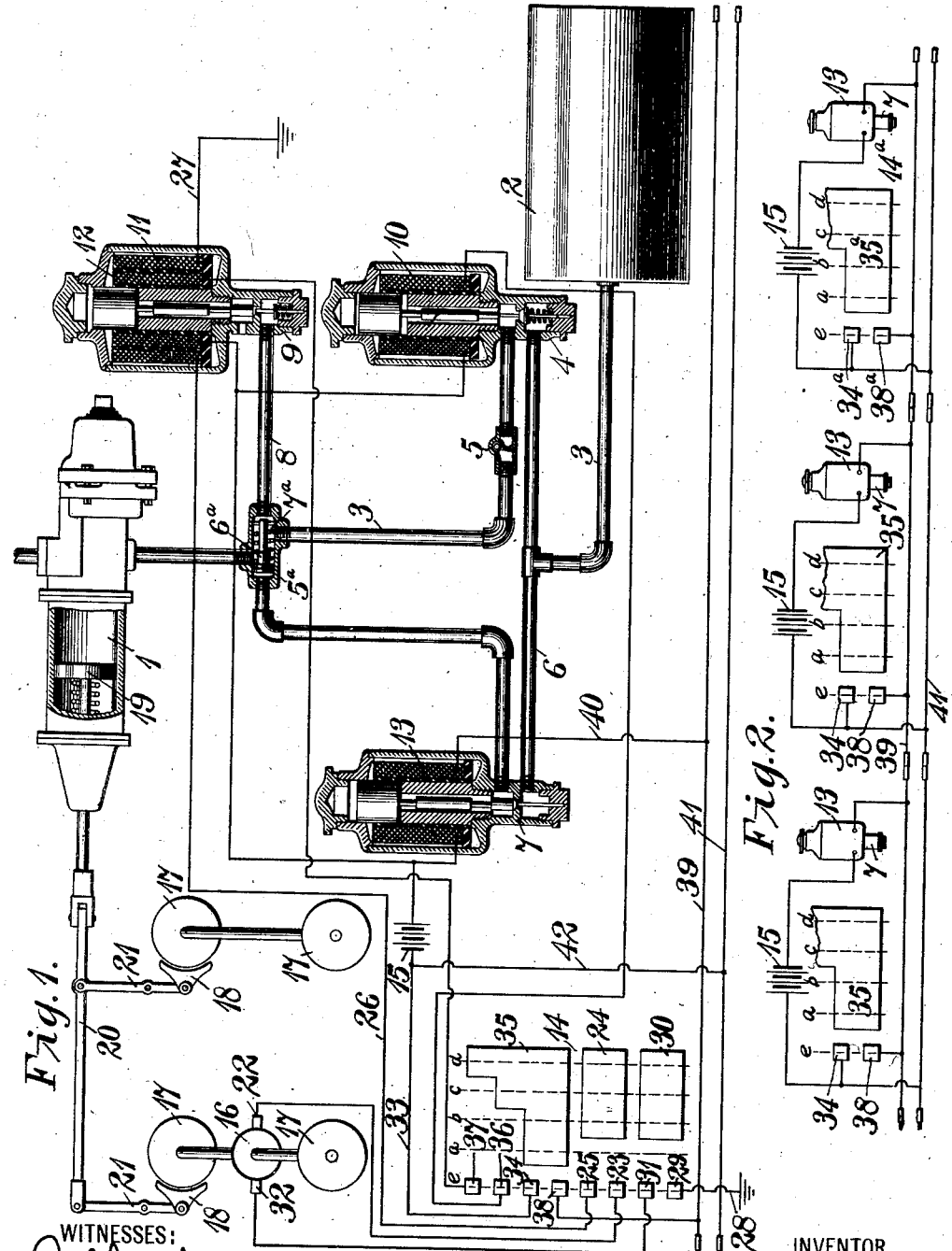
WITNESSES:
INVENTOR
William Cooper
BY
ATTORNEY

UNITED STATES PATENT OFFICE.

WILLIAM COOPER, OF WILKINSBURG, PENNSYLVANIA, ASSIGNOR, BY MESNE ASSIGN-
MENTS, TO THE WESTINGHOUSE AIR BRAKE COMPANY, A CORPORATION OF PENN-
SYLVANIA.

VEHICLE BRAKING SYSTEM.

1,003,035. Specification of Letters Patent. Patented Sept. 12, 1911.

Application filed October 3, 1905, Serial No. 281,190. Renewed December 14, 1908. Serial No. 467,540.

*To all whom it may concern:*

Be it known that I, WILLIAM COOPER, a citizen of the United States, and a resident of Wilkinsburg, in the county of Allegheny and State of Pennsylvania, have invented a new and useful Improvement in Vehicle Braking Systems, of which the following is a specification.

My invention relates to vehicle braking systems, and it has special reference to means for governing a plurality of independent systems of automatic brake pressure regulation which are adapted for application to the several units of a railway train and are capable of multiple control.

The object of my invention is to provide simple and reliable means for automatically applying the brakes on one or more vehicles which form a section of a train equipped as above indicated and which have, for any reason, been separated from the forward section of the train of which they were a part.

In order to avoid destructive accidents in case a train of cars is inadvertently broken into sections, it is desirable to automatically bring the detached section to rest by setting the brakes on the cars which are separated from the control center. Hitherto this result has been accomplished in vehicle trains which are equipped with pneumatic braking systems by means dependent upon the rupture of a fluid supply pipe which usually forms a continuous connection from a reservoir or a compressor on one of the vehicles to receiving tanks on all of the others. For the accomplishment of this result in trains of electric vehicles which are capable of multiple operation and are provided with independent braking systems, I have provided automatic means dependent upon the rupture of a train line conductor through which the several units are simultaneously controlled, for effecting the immediate application of an emergency brake on the detached section of the train.

Figures 1 and 2 of the accompanying drawings illustrate a convenient means for carrying out my invention and are diagrammatic views, respectively, of a single, typical car equipment and partial electrical connections for several vehicles similarly equipped.

Referring to the drawings, a brake cylinder 1 is supplied with fluid pressure from a pressure storage tank 2 through a pipe 3, that is provided with an admission valve 4 and a check valve 5 and a slide valve $5^a$. Fluid pressure may also be supplied in case of emergency or accident from the tank 2 through a pipe 6, an emergency valve 7 and the slide valve $5^a$. The slide valve $5^a$ comprises a piston $6^a$ which is normally held in such position by a spring $7^a$, that the pipes leading from the valves 4 and 9 and the brake cylinder 1 are interconnected, but when pressure is applied through the valve 7 the piston is forced into such a position that connection from the cylinder to the valves 4 and 9 is cut off, while connection from the valve 7 to the cylinder is completed. An outlet is provided between the cylinder 1 and the check valve 5 through a branch pipe 8 and a release valve 9. The admission valve 4, the release valve 9 and the emergency valve 7 are respectively actuated by electro-magnet coils 10, 11 and 12, and 13. Electrical energy is supplied to the magnet coils through a controller 14 which is adapted to occupy a plurality of positions $a$, $b$, $c$, $d$, and $e$ and obviously may be combined with any well known form of electric vehicle controller to constitute the braking notches. The magnet coils 10, 12 and 13 are supplied with energy at a substantially constant potential from any convenient source such as a battery 15, while the coil 11 of the valve 9 is supplied with energy from a motor 16 that may preferably be one of the motors of a vehicle equipment which is run as a generator during the braking period, its field magnet windings being energized from a constant potential source or the residual magnetism of its field magnets being relied upon for the initial field excitation.

The motor 16 may be arranged in any well known manner to drive the wheels 17 of the vehicle to which the equipment is applied and brake shoes 18 may be so connected to a piston 19 which operates in the cylinder 1, by means of a piston rod 20 and the intermediate levers 21, that the fluid pressure in the cylinder forces the shoes into engagement with the peripheries of the wheels and gives the desired braking effect.

When it becomes desirable to apply the brakes the controller 14 is moved from a position $a$ through the position $b$ to the position $c$ when a circuit is completed from one armature terminal 22 of the motor 16 through a contact finger 23, ring segment 24, finger 25, conductor 26, magnet coil 11 and conductor 27 to the ground, the circuit connections being completed from the ground through a conductor 28, contact finger 29, ring segment 30 and contact finger 31 to the opposite armature terminal 32 of the motor 16. Circuit connections are also completed from a positive terminal of the battery 15 through conductor 33, contact finger 34, ring segment 35, contact finger 36 and the magnet coil 10 to the negative terminal of the battery. The valves 4 and 9 are so arranged that the energizing of the magnet coil 11 closes the release valve 9 and when the controller 14 is in the position $c$ pressure is admitted from the tank 2 to the cylinder 1 through the check valve 5 which serves to prevent the air from exhausting therethrough when the coil 10 is deënergized. Under ordinary circumstances the controller 14 is then moved to the position $b$ so that the coil 10 is deënergized and the coil 11 is energized only by the current supplied from the motor 16 and as the speed of the motor decreases the voltage delivered therefrom will proportionally decrease so that the magnet coil 11 becomes weakened until pressure in the cylinder 1 is sufficient to force the valve 9 open. The valve 9 is held in this open position until the pressure in the cylinder 1 has become so reduced, relative to the strength of the current supplied to the magnet 11, that the valve is again closed. The operation is automatically repeated as the speed of the vehicle decreases until it is brought to rest and the pressure in the cylinder is reduced to zero. It is sometimes desirable, however, as is the case when stopping a vehicle on a grade, to maintain the pressure in the cylinder 1 for some considerable length of time after the vehicle has been brought to rest, in which case the controller 14 may be moved to a position $d$ when a circuit is completed from the positive battery terminal, through the contact finger 34, ring segment 35, contact finger 37 and the magnet coil 12 of the valve 9 to the negative battery terminal. The energizing of the magnet coil 12 holds the valve 9 closed regardless of the strength of the coil 11 so that pressure is maintained in the cylinder 1.

When it becomes desirable to apply full pressure to the brakes very suddenly, as in case of accident, the controller 14 is moved to the position $e$ which releases the valve 7 and admits full pressure from the tank 2 to the cylinder 1. The emergency valve 7 is normally held closed by the actuation of the magnet coil 13 which is continuously energized from the battery 15 while the controller 14 occupies the several positions $a$, $b$, $c$, and $d$, connections being completed from the positive battery terminal through conductor 33, contact finger 34, ring segment 35, contact finger 38, conductors 39 and 40 to the magnet coil 13 and the negative battery terminal.

When several vehicles which are similarly equipped with electrically controlled pneumatic braking systems, the controller on the forward vehicle which is used as a master switch is operated to simultaneously apply the brakes to the whole train as hereinbefore explained for a single equipment, the circuit connections for the several magnet valves being interconnected by a train line in a well known manner.

Since my invention relates particularly to emergency brake applications I deem it unnecessary to show complete train line connections for operating the application and release valve magnets but I have shown in Fig. 2 the electrical connections for a plurality of units equipped with emergency brake magnets, the several units being interconnected by a plurality of train line conductors 39 and 41. The several controllers exclusive of the one which is used as a master switch occupy the position $e$ in which position the contact fingers 34 and 38 are moved out of engagement with the ring segments 35 so that the emergency valve magnet windings 13 are deënergized and the brakes are set until connections are completed through the train line conductors 39 and 41 when a circuit is completed from the batteries 15 through the conductors 42, the conductor 41, the finger $34^a$, ring segment $35^a$ and finger $38^a$ of the master switch $14^a$ which occupies the position $a$, conductor 39 and magnet windings 13 to the negative terminals of the batteries 15. In this way all the emergency valve magnet windings are energized as long as the master switch occupies positions $a$, $b$, $c$ and $d$, and the train line conductors 39 and 41 remain intact. If, however, one or more units of the train become disconnected from the remaining portion on which the master switch is located such units are quickly brought to rest by the application of fluid pressure through the emergency valve, since the valve magnet circuit is interrupted by the rupture of conductors 39 and 41. The emergency valves may all be applied by moving the master controller $14^a$ to position $e$ at the will of the operator.

The connections for the valve magnets may obviously be varied without departing from the spirit of my invention and I desire that such variations shall be included within its scope.

I claim as my invention:

1. In a fluid braking system for electric vehicles, the combination with an electrically controlled release valve, and means for automatically varying the voltage applied to the valve magnet, of an emergency application valve, and means dependent upon its operation for rendering the release valve inoperative.

2. In a fluid braking system for electric motor-driven vehicles, the combination with an electrically operated release valve which is dependent for its action upon the current delivered from one or more motors of the vehicle equipment during the braking period, of an emergency application valve, and means dependent upon the operation of the emergency valve for rendering the release valve inoperative.

3. In a fluid-pressure braking system, the combination with an admission valve, and an exhaust valve, of an emergency application valve, and means dependent upon the operation of the emergency valve for rendering the admission and exhaust valves inoperative.

4. In a fluid-pressure vehicle braking system, the combination with an admission valve, and an electrically operated release valve which is automatically dependent upon the action of the vehicle during the braking period, of an emergency application valve, and means dependent upon the operation of the emergency valve for rendering the admission and exhaust valves inoperative.

5. In a fluid braking system for electric vehicles, the combination with an admission valve, and a release valve, of means for governing the action of said valves, of automatic means dependent upon the current delivered from one or more of the motors during the braking period for regulating the action of the release valve, of an emergency application valve, and means dependent upon the operation of the emergency valve for rendering the admission and exhaust valves inoperative.

6. In a vehicle braking system, the combination with a brake cylinder, and electrically operated admission and exhaust valves which are respectively opened and closed by the electrical energy, of an emergency admission valve, and a slide valve which severs the connection between the brake cylinder and the normal admission and release valves and which is dependent upon the operation of the emergency valve.

7. In a train of vehicles, the combination with a plurality of independent brake systems therefor each of which comprises an electrical control release valve, means for automatically varying the voltage applied to the valve magnet, and an emergency admission valve, of means dependent upon its operation for rendering the release valve inoperative, and means for automatically operating the braking systems upon the detachment from the train of one or more vehicles to stop said vehicles.

8. In a train of vehicles, the combination with a plurality of independent braking systems therefor each of which comprises an admission valve, an exhaust valve, and an emergency valve, of means for automatically actuating the emergency valve upon the detachment from the train of one or more vehicles to stop said vehicles, and means dependent upon the operation of an emergency valve for rendering the admission and release valves inoperative.

9. In a train of vehicles, the combination with a plurality of independent braking systems therefor that are electrically governed, means for normally grading the brake pressure as the vehicles are retarded, and a plurality of train line conductors for connecting the several governing units together, of means for automatically operating the braking systems, upon the detachment from the train of one or more vehicles, to suddenly stop the detached vehicles.

10. In a train of vehicles, the combination with a plurality of independent braking systems therefor each comprising means for automatically reducing the brake pressure as the vehicle is retarded, and a series of electrically governed control systems which are connected by a continuous train line conductor, of means independent of said pressure reducing means and dependent upon the rupture of the train line for automatically setting the brakes on a detached section of the train.

In testimony whereof, I have hereunto subscribed my name this 29th day of September, 1905.

WILLIAM COOPER.

Witnesses:
O. A. Y. SANDBORGH,
BIRNEY HINES.